United States Patent [19]
Friedrich et al.

[11] Patent Number: 5,921,135
[45] Date of Patent: Jul. 13, 1999

[54] METHOD AND CIRCUIT CONFIGURATION FOR GEAR DETECTION IN A MOTOR VEHICLE TRANSMISSION

[75] Inventors: Arno Friedrich, Regensburg; Klaus Wenzlawski, Nürnberg, both of Germany

[73] Assignee: Siemens Aktiengesellschaft, Munich, Germany

[21] Appl. No.: 08/903,994

[22] Filed: Jul. 31, 1997

[30] Foreign Application Priority Data

Jul. 31, 1996 [DE] Germany .................... 196 30 937

[51] Int. Cl.⁶ .................................................. F16H 59/00
[52] U.S. Cl. ............................ 74/335; 477/906; 701/61; 701/64
[58] Field of Search ...................... 74/336 R, 335; 477/79, 80, 906, 124; 701/60, 61, 53, 54, 64

[56] References Cited

U.S. PATENT DOCUMENTS

| | | | |
|---|---|---|---|
| 4,680,988 | 7/1987 | Mori | 701/60 |
| 4,701,852 | 10/1987 | Ulveland | 701/64 |
| 5,239,895 | 8/1993 | Kroger | 477/109 |
| 5,682,315 | 10/1997 | Coutant et al. | 701/57 |

FOREIGN PATENT DOCUMENTS

0438917B1  3/1994  European Pat. Off. .
0654622A1  5/1995  European Pat. Off. .

*Primary Examiner*—John A. Jeffery
*Assistant Examiner*—Brandon C. Stallman
*Attorney, Agent, or Firm*—Herbert L. Lerner; Laurence A. Greenberg

[57] ABSTRACT

A method and a circuit configuration for gear detection in a motor vehicle transmission detect a signal corresponding to an input rpm and a signal corresponding to an output rpm of the transmission. A quotient of the output rpm to the input rpm is formed. A gear that has been engaged is detected from this quotient and from a known gear ratio of the transmission. A variation over time of the ratio of the output rpm to the input rpm of the transmission is ascertained and compared with a limit value. If the limit value is exceeded, a determination is made that no gear has been engaged.

6 Claims, 2 Drawing Sheets

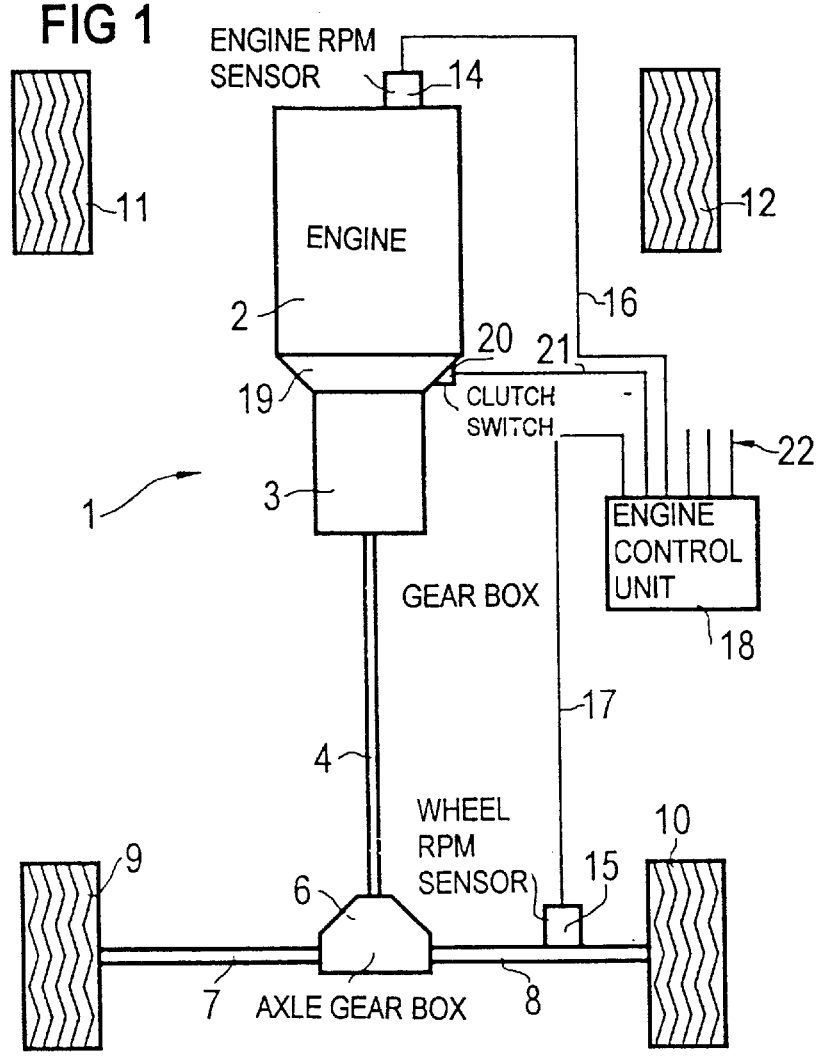
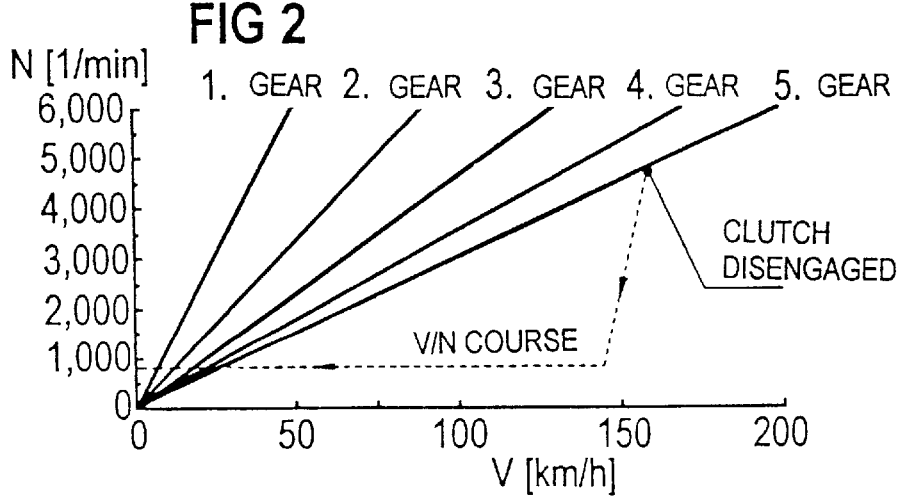

METHOD AND CIRCUIT CONFIGURATION FOR GEAR DETECTION IN A MOTOR VEHICLE TRANSMISSION

BACKGROUND OF THE INVENTION

Field of the Invention

The invention relates to a method for gear detection in a transmission of a motor vehicle, by detecting a signal corresponding to an input rpm and a signal corresponding to an output rpm of the transmission and by forming a ratio between the two signals, wherein an engaged gear is detected from the ratio and from a known gear ratio of the transmission in various gears. The invention also relates to a circuit configuration for gear detection in a motor vehicle transmission, including a first sensor for detecting a signal corresponding to the input rpm of the transmission, a second sensor for detecting a signal corresponding to the output rpm of the transmission, and a device for forming a quotient of the output rpm to the input rpm and for detecting which gear has been engaged from the quotient and from a gear ratio of the transmission in the individual gears.

In order to improve the driving performance of motor vehicles having an internal combustion engine and a gear box, it is necessary to know whether or not a gear of the transmission, and which one, has just been engaged. Driving performance functions can be favorably varied with that information. Examples are an idling controller, an anti-bucking function, and a load impact damping of the motor vehicle power train.

In a method for controlling an automatic mechanical motor vehicle transmission system, which is known from European Patent 0 438 917 B1, the input rpm and the output rpm of the transmission are detected, and those two rpm values and the gear ratio of the particular gear which is selected are linked with one another. That will detect any instance where a gear that has been selected is not properly engaged, or if the gearshift lever pops out of engagement. However, that requires that the intended gear, or the corresponding gear ratio, be reported to a control computer by a transmission controller. The known control method does not enable ascertaining the gear ratio.

SUMMARY OF THE INVENTION

It is accordingly an object of the invention to provide a method and a circuit configuration for gear detection in a motor vehicle transmission, which overcome the herein-aforementioned disadvantages of the heretofore-known methods and devices of this general type, which are capable of detecting whether or not a gear has been engaged as well as which gear has been engaged, and which do not require that a desired value for the gear be known.

With the foregoing and other objects in view there is provided, in accordance with the invention, a method for gear detection in a transmission of a motor vehicle, which comprises detecting a signal corresponding to an input rpm and a signal corresponding to an output rpm of a transmission; forming a ratio between the two signals and a quotient of the output rpm to the input rpm; detecting an engaged gear from the ratio and from a known gear ratio of the transmission in various gears; ascertaining a change over time in the quotient of the output rpm to the input rpm of the transmission and comparing the change with a limit value; and determining that no-gear has been engaged if the limit value is exceeded.

In accordance with another mode of the invention, there is provided a method which comprises ascertaining the derivation over time of the ratio of the output rpm to the input rpm and comparing the derivation over time with a predetermined threshold value; and determining that no gear stage has been engaged if the derivation is above the threshold value.

In accordance with a further mode of the invention, there is provided a method which comprises evaluating a signal of a sensor detecting a state of a clutch of a motor vehicle; and determining that no gear has been engaged if the clutch is signaled to be open.

In accordance with an added mode of the invention, there is provided a method which comprises ascertaining an engaged gear, once a non-engaged gear has been detected for the first time, only whenever a transition of the clutch from open to closed has been signaled beforehand.

With the objects of the invention in view there is also provided a circuit configuration for gear detection in a motor vehicle transmission, comprising a first sensor for detecting a signal corresponding to an input rpm of a transmission; a second sensor for detecting a signal corresponding to an output rpm of the transmission; and a device connected to the sensors for forming a quotient of the output rpm to the input rpm, for detecting which gear has been engaged from the quotient and from a gear ratio of the transmission in individual gears, for ascertaining a variation over time in the quotient of the output rpm to the input rpm of the transmission and comparing the variation over time with a limit value, and for determining that no gear has been engaged if the limit value is exceeded In accordance with a concomitant feature of the invention, there is provided a sensor detecting a state of a clutch of the motor vehicle and supplying a signal to be evaluated for determining that no gear has been engaged if the clutch is signaled to be open.

The advantages of the invention include on one hand the fact that with it, highly variable mistakes in detecting a gear which is not engaged are avoided, for instance when shifting gears, when the car is coasting, in driving downhill without engaging a gear, and so forth. On the other hand, the gear detection can be integrated into the engine control unit of the motor vehicle without requiring an additional data connection with the transmission.

Other features which are considered as characteristic for the invention are set forth in the appended claims.

Although the invention is illustrated and described herein as embodied in a method and a circuit configuration for gear detection in a motor vehicle transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic and schematic view of essential components of a power train of a motor vehicle;

FIG. 2 is a gear diagram for a five-speed transmission, in which an rpm course for a vehicle that is coasting is plotted.

DESCRIPTION OF THE PREFERRED EMBODIMENTS

Figure 3:
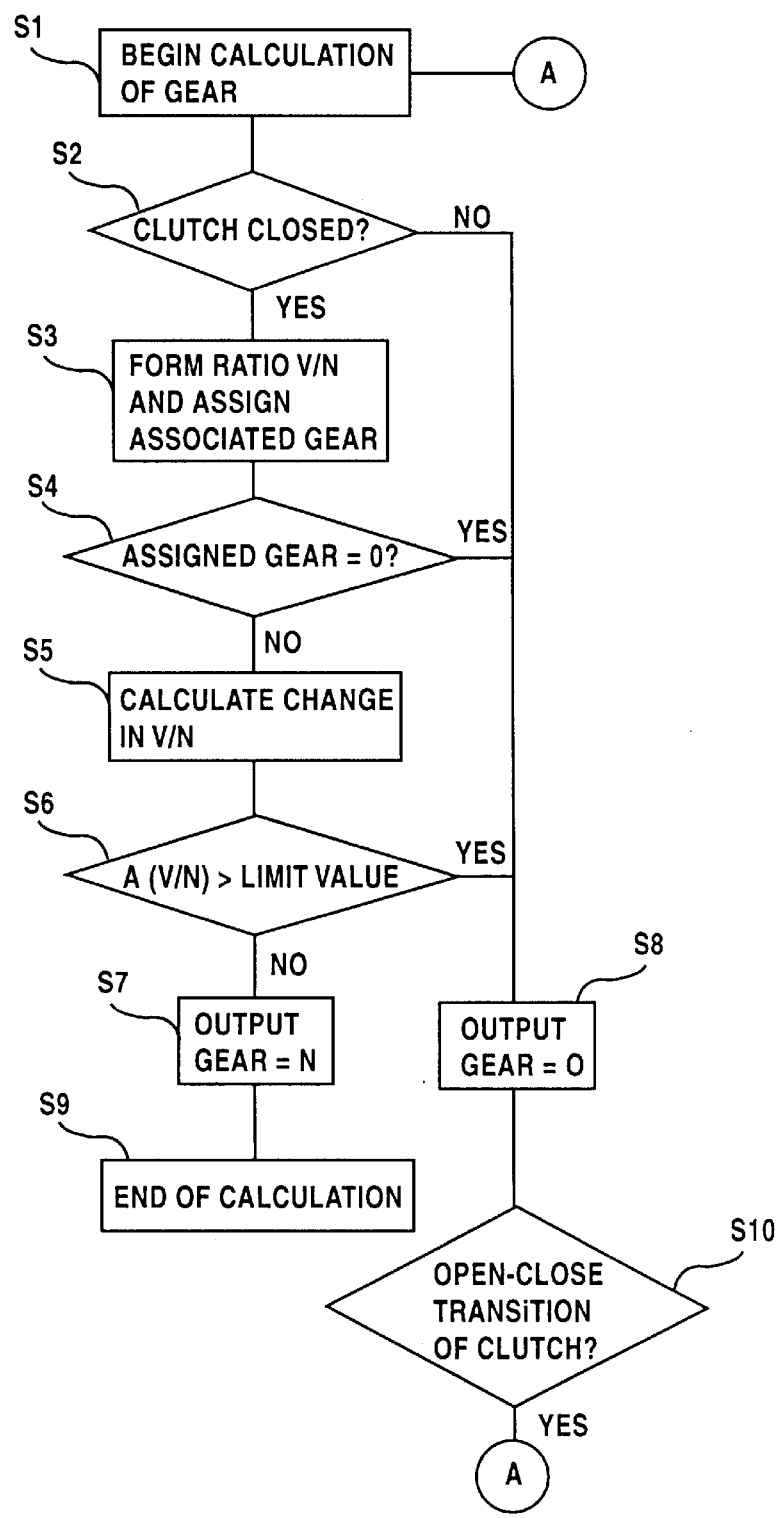
FIG. 3 is an illustration of a program in the form of a flow chart, that is executed by gear detector according to the invention.

Referring now to the figures of the drawings in detail and first, particularly, to FIG. 1 thereof, there is seen a diagrammatically and schematically illustrated motor vehicle power train 1 which includes an engine 2 and a gear box or transmission 3 that is connected through a cardan shaft or universal joint shaft 4 to a rear axle gearbox or differential 6. The axle gearbox or differential 6 is in turn connected to driven rear wheels 9 and 10 through axles 7 and 8. Front wheels 11 and 12 are not driven.

A first rpm sensor 14 serves to ascertain an engine speed or rpm N and generates a corresponding signal, which agrees with an rpm of an input shaft of the transmission 3 when a clutch 19 is engaged or closed. A second rpm sensor 15 serves to ascertain a speed or rpm of the rear wheels and generates a corresponding signal, which agrees with a vehicle speed V and which is equivalent to an rpm of an output shaft of the transmission 3, taking a gear ratio in the axle gearbox 6 into account.

The signals of the rpm sensors 14 and 15 travel over lines 16 and 17 to an engine control unit 18, where they are evaluated. If a clutch switch 20 is connected to the clutch 19, it has a sensor which signals a state of the clutch to the engine control unit 18 over a line 21, or in other words it signals whether the clutch is "open" or "closed".

Other control and signal lines 22 are merely suggested herein, because they are of no significance to the invention. The lines 22 connect the engine control unit to various other sensors and actuators in the motor vehicle, such as an ignition controller and an injection controller.

A gear diagram of FIG. 2 shows the engine rpm N as a parameter as a function of the vehicle speed V along with various gears of the transmission 3. FIG. 2 also shows that each gear stage has a fixed speed/rpm ratio V/N. Conversely, this ratio V/N can be calculated, and the gear stage that has just been engaged can be associated therewith.

Conventionally, no notice is taken as to whether force locking actually exists, so that when changing gears or when the vehicle is coasting, the wrong gear stages can be reported. A force-locking connection is one which connects two elements together by force external to the elements, as opposed to a form-locking connection which is provided by the shapes of the elements themselves. Such coasting of a motor vehicle is represented by dotted lines in FIG. 2: After the clutch is disengaged, a gradually decreasing vehicle speed V occurs, initially with a rapidly dropping rpm N and then with the rpm held at idling. Another potential source of error is that if the vehicle is traveling downhill without any gear being engaged, a constant steady speed is established, at which a gear stage is incorrectly associated with the V/N ratio. Mistaken reports of this and other kinds can often cause undesired reactions in the driving and control performance of the vehicle power train 1.

In order to ensure the reliable determination of whichever gear stage has just been engaged, the following provisions are taken according to the invention:

1. In order to determine the gear stage, first the V/N ratio is calculated from the signals of the sensors 14 and 15, and this ratio is then associated with a gear stage on the basis of the gear diagram, or in other words on the basis of the known gear ratios of the individual gears or gear stages of the transmission 3. It is possible to prescribe that the measured V/N ratio be within a narrow range of tolerance around the mathematically precise ratio V/N of a gear stage if that gear is to be detected as having been engaged. A tolerance range is used to compensate for errors caused by differences in wheel diameter, dissimilar sampling rates of the rpm sensors 14 and 15, effects of aging, or other unavoidable factors.

The engine rpm N and the vehicle speed must be measured at the same instant and for the same period of time if a correct ratio V/N is to be obtained. This assures that the gear stage will be detected as zero as soon as there is a departure from the ratio V/N, such as when changing gears.

2. In order to prevent a gear stage from being reported incorrectly as soon as the measured V/N according to the performance graph corresponds to a gear stage, for instance when the vehicle is coasting and the clutch is not engaged, or in other words in the idling or neutral position of the transmission 3, the change in the ratio V/N, that is $\Delta(V/N) = V/N_{new} - V/N_{old}$ is calculated, or the derivation with respect to time (which is also called a gradient) of the ratio V/N of the output rpm to the input rpm is additionally ascertained and evaluated. If V/N varies more rapidly than allowed by a predetermined threshold value (such as 0.6), then the finding is that no gear stage has been engaged, even if a corresponding performance graph range has just been traversed. The immediate report is "gear=0". It does not matter whether the performance graph reports "gear=0" or some engaged gear at the instant that the threshold value is first exceeded 3. If there is a sensor 20 in the vehicle that reports the state of the clutch 19 (closed or opened), then immediately after opening of the clutch, the report is "idling" or "gear=0". The gear=0 detection can thus be speeded up during gear changing, as compared with detection using the performance graph.

4. Once the method has first detected "gear=0", then a new gear stage is reported only if a transition in the clutch signal from open to closed has taken place, regardless of the performance graph, as seen in FIG. 2. The reporting of an engaged gear stage when driving at constant speed and constant rpm without force locking, such as when driving downhill, is thus avoided.

A program that is executed in the method according to the invention for gear detection, is shown in FIG. 3 in the form of a flow chart. By way of example, the program, which includes steps S1–S9 described below, is executed by the engine control unit 18, that is by a computer contained therein that is known per se and is therefore not described herein.

S1: Begin calculation of the gear to be ascertained.

S2: Ask whether or not the clutch is closed. If the answer is yes, that is if the clutch is closed, then the program is continued in a step S3. If the answer is no, that is if the clutch is open, the program proceeds in a step S8.

S3: Form the ratio of the vehicle speed to the engine speed V/N and associate a gear with this ratio.

S4: Ask whether or not the calculated gear is 0. If the answer is no, the program continues with a step S5. If the answer is yes, the program continues with the step S8.

S5: Calculate the change in the ratio V/N: $\Delta(V/N) = V/N_{new} - V/N_{old}$.

S6: Ask whether or not $\Delta(V/N)$ is greater than a predetermined limit value (such as 0.6). If not, the method continues with a step S7, and if so with the step S8.

S7: Effect an output "gear=N" (n=1, 2, . . . , 5).

S8: Effect an output "gear=0".

S9: End the calculation. After a predetermined length of time, a gear calculation is carried out again, beginning at the step S1.

S10: Ask whether or not the sensor 20 has signaled a transition in the clutch from the "open" state to the "closed" state. If so then return to the beginning of the calculation, as is indicated by a letter A.

The gear detection according to the invention is thus carried out in a less complicated way, and mistakes in identifying a gear are reliably avoided.

We claim:

1. A method for gear detection in a transmission of a motor vehicle, which comprises:

detecting a signal corresponding to an input rpm and a signal corresponding to an output rpm of a transmission;

forming a ratio between the two signals and a quotient of the output rpm to the input rpm;

detecting an engaged gear by comparing the ratio between the two signals with a known gear ratio of the transmission in various gears;

ascertaining a temporal change of the quotient of the output rpm to the input rpm of the transmission and comparing the change with a limit value; and determining that no gear is engaged if the limit value is exceeded.

2. The method according to claim 1, which comprises: ascertaining the derivative of the ratio of the output rpm to the input rpm with respect to time and comparing the derivative with respect to time with a predetermined threshold value; and determining that no gear is engaged if the derivative is above the threshold value.

3. The method according to claim 1, which comprises:

evaluating a signal of a sensor detecting a state of a clutch of a motor vehicle; and determining that no gear has been engaged if the clutch is signaled to be open.

4. The method according to claim 3, which comprises ascertaining an engaged gear, once a non-engaged gear has been detected, only after a transition of the clutch from open to closed has been signaled.

5. A circuit configuration for gear detection in a motor vehicle transmission, comprising:

a first sensor for detecting a signal corresponding to an input rpm of a transmission;

a second sensor for detecting a signal corresponding to an output rpm of the transmission; and a device connected to said sensors for forming a quotient of the output rpm to the input rpm, for detecting which gear has been engaged from the quotient and from a gear ratio of the transmission in individual gears, for ascertaining a temporal variation of the quotient of the output rpm to the input rpm of the transmission and comparing the temporal variation with a limit value, and for determining that no gear is engaged if the limit value is exceeded.

6. The circuit configuration according to claim 5, including a sensor detecting a state of a clutch of the motor vehicle and supplying a signal to be evaluated for determining that no gear has been engaged if the clutch is signaled to be open.

* * * * *